(12) United States Patent
Foster et al.

(10) Patent No.: US 10,683,085 B2
(45) Date of Patent: Jun. 16, 2020

(54) AIRCRAFT ASSEMBLY

(71) Applicant: Safran Landing Systems UK Limited, Gloucester (GB)

(72) Inventors: Nicholas Foster, Gloucester (GB); Nikhil Sehgal, Gloucester (GB); Daniel Mulley, Gloucester (GB); Peter Scott, Gloucester (GB)

(73) Assignee: Safran Landing Systems UK LTD (GB)

( * ) Notice: Subject to any disclaimer, the term of this patent is extended or adjusted under 35 U.S.C. 154(b) by 129 days.

(21) Appl. No.: 15/284,751

(22) Filed: Oct. 4, 2016

(65) Prior Publication Data

US 2017/0096215 A1 Apr. 6, 2017

(30) Foreign Application Priority Data

Oct. 6, 2015 (EP) .................................. 15188604

(51) Int. Cl.
*F16C 11/12* (2006.01)
*B64C 25/00* (2006.01)
*F16B 5/12* (2006.01)

(52) U.S. Cl.
CPC ............ *B64C 25/001* (2013.01); *F16B 5/125* (2013.01); *F16C 11/12* (2013.01); *F16C 2326/43* (2013.01); *Y10T 403/32622* (2015.01)

(58) Field of Classification Search
CPC ..... Y10T 403/32541; Y10T 403/32622; Y10T 403/45; Y10T 403/54; Y10T 403/606; Y10T 16/5257; F16C 11/12; F16C 11/04; F16F 2230/34; B64C 9/02; B64C 25/001; E05D 1/02; F16B 5/125

USPC ........ 403/111, 121, 220, 291, 329; 267/133, 267/160
See application file for complete search history.

(56) References Cited

U.S. PATENT DOCUMENTS

| 661,346 | A | * | 11/1900 | Lincoln | ..................... | E05D 1/00 16/277 |
| 3,501,800 | A | * | 3/1970 | O'Dea | ..................... | F16C 11/04 16/227 |
| 3,913,656 | A | * | 10/1975 | Guyer | ..................... | A47G 5/00 160/135 |
| 3,927,438 | A | * | 12/1975 | Blake | ..................... | E05D 1/00 16/227 |

(Continued)

FOREIGN PATENT DOCUMENTS

| GB | 2257198 | 1/1993 |
| WO | 03062052 | 7/2003 |

(Continued)

OTHER PUBLICATIONS

Vilatela, Juan J, and Alan H Windle. "Yarn-like Carbon Nanotube Fibres". Aug. 31, 2010. John Wiley & Sons, Inc. Date Accessed: Sep. 18, 2018. (Year: 2010).*

(Continued)

*Primary Examiner* — Matthew R McMahon
(74) *Attorney, Agent, or Firm* — RatnerPrestia (57) ABSTRACT

An aircraft assembly having a first body connected to a second body via a flexible coupling arranged to limit separation of the bearing faces while permitting relative rotational movement between the bodies in a movement plane so as to define a joint between the bodies.

18 Claims, 4 Drawing Sheets

(56) References Cited

U.S. PATENT DOCUMENTS

| | | | | |
|---|---|---|---|---|
| RE28,672 E * | 1/1976 | Wakeman | | E05D 1/00 16/227 |
| 3,932,045 A * | 1/1976 | Hillberry | | A61F 2/3836 384/50 |
| 3,945,053 A * | 3/1976 | Hillberry | | A61F 2/3836 623/20.24 |
| 4,095,366 A * | 6/1978 | Buck | | A63F 9/088 446/487 |
| 4,163,303 A * | 8/1979 | Hanna | | E05D 1/02 16/227 |
| 4,267,608 A * | 5/1981 | Bora, Jr. | | A61F 2/3836 403/111 |
| 4,558,911 A * | 12/1985 | Ruoff | | B25J 9/104 338/79 |
| 4,619,304 A * | 10/1986 | Smith | | E05D 1/00 16/226 |
| 4,821,373 A * | 4/1989 | Maidment | | E05D 1/00 16/227 |
| 4,843,679 A * | 7/1989 | Maidment | | E04B 2/7429 16/227 |
| 5,029,030 A * | 7/1991 | Luecke | | G11B 5/5521 360/264.7 |
| 5,125,193 A * | 6/1992 | Beaulieu | | G09F 15/0068 16/227 |
| 5,167,385 A | 12/1992 | Hafner | | |
| 5,367,744 A * | 11/1994 | Ahlberg | | E04B 2/7429 16/227 |
| 5,732,757 A * | 3/1998 | Mariol | | A47B 47/0033 16/225 |
| 6,283,666 B1 * | 9/2001 | Genequand | | F16C 11/12 403/119 |
| 6,474,945 B1 * | 11/2002 | Nakasato | | B64C 27/615 29/889.7 |
| 6,754,998 B2 * | 6/2004 | Diffrient | | E04B 2/7424 160/135 |
| 6,910,304 B2 * | 6/2005 | Warren | | B64G 1/222 52/108 |
| 6,926,546 B2 * | 8/2005 | Kurokawa | | G06F 1/1618 174/254 |
| 7,328,481 B2 * | 2/2008 | Barnett | | E05D 3/08 16/227 |
| 7,425,103 B2 * | 9/2008 | Perez-Sanchez | | B64C 9/02 16/227 |
| 7,451,950 B2 * | 11/2008 | Perez-Sanchez | | B64C 9/02 16/225 |
| 7,515,385 B1 * | 4/2009 | Abrahamson | | G11B 5/5569 360/264.6 |
| 8,881,520 B2 * | 11/2014 | Emigh | | F16C 11/12 200/16 R |
| 9,086,845 B2 * | 7/2015 | Chen | | G06F 1/1626 |
| 9,427,876 B2 * | 8/2016 | Mozeika | | B25J 17/00 |
| 9,499,213 B2 * | 11/2016 | Stegawski | | F16C 11/12 |
| 10,227,804 B2 * | 3/2019 | Howell | | E05D 1/00 |
| 10,301,858 B2 * | 5/2019 | Maatta | | E05D 11/0081 |
| 2005/0116097 A1 | 6/2005 | Reniau | | |
| 2011/0177279 A1 | 7/2011 | Casteras | | |
| 2012/0150309 A1 * | 6/2012 | Marissen | | A61F 2/4241 623/21.15 |
| 2013/0152724 A1 * | 6/2013 | Mozeika | | B25J 17/00 74/490.05 |
| 2015/0034762 A1 | 2/2015 | Reber et al. | | |
| 2015/0166171 A1 * | 6/2015 | Casse | | B64C 9/02 244/99.2 |
| 2015/0255023 A1 * | 9/2015 | Lee | | G09G 3/36 345/204 |

FOREIGN PATENT DOCUMENTS

| | | |
|---|---|---|
| WO | 2010125145 | 11/2010 |
| WO | 2013011324 | 1/2013 |
| WO | 2014111685 | 7/2014 |

OTHER PUBLICATIONS

European Search Report for EP 15188604, dated Apr. 8, 2016, 6 pages.

* cited by examiner

AIRCRAFT ASSEMBLY

This application claims the benefit of and priority to European Application 15188604.1, filed Oct. 6, 2015, the contents of which are incorporated herein by reference.

BACKGROUND OF THE INVENTION

It is common for an aircraft assembly to include a first body pivotally coupled to a second body. Often, the bodies will be coupled via a pin joint which defines a pivot axis. Examples of such assemblies are landing gear stay arms, lock stays, torque links and the bogie pivot joint.

In order to keep friction at an acceptable level, it is generally a requirement that fresh grease is periodically applied to aircraft assembly joints during maintenance operations; for example, every 500 landing cycles.

Such maintenance operations can be time consuming and costly. Moreover, a joint can become dry in the absence of a required quantity of grease, which can increase wear and friction.

SUMMARY OF THE INVENTION

According to a first aspect of the invention, there is provided an aircraft assembly joint comprising:
  a first body having a first side, a second side and a bearing face extending between the sides;
  a second body having a first side, a second side and a bearing face extending between the sides, the bodies being positioned relative to one another such that the bearing faces are adjacent to one another and the first side of each body is closer to the first side of the other body than it is to the second side of the other body; and
  a flexible coupling arranged to limit separation of the bearing faces while permitting relative rotational movement between the bodies in a movement plane, the flexible coupling comprising:
    one or more flexible straps arranged in a first configuration in which the straps are coupled to the first side of the first body and coupled to the second side of the second body; and
    one or more flexible straps arranged in a second configuration in which the straps are coupled to the second side of the first body and coupled to the first side of the second body, the straps of the first and second configurations being arranged in parallel across the joint.

Thus, the joint according to the first aspect of the invention enables the first body to rotate relative to the second body in a movement plane through rolling engagement between the bearing faces while the flexible coupling holds the bodies together and in alignment. The straps can create a non-slip condition between the bodies during operation of the joint and can provide cross-axial stiffness in the joint. The rolling engagement between the bodies creates a creeping pivot, resulting in a low friction environment because the bearing faces are moving relative to one another in a rolling manner, rather than sliding against one another. The low friction environment can enable lubricant to be dispensed with, which can lead to a reduced level of maintenance.

The coupling can comprise first and second outer pairs of straps, each outer pair comprising a strap arranged in the first configuration and a strap arranged in the second configuration, the first outer pair being located adjacent to a first edge of one of the bearing faces and the second outer pair being located adjacent to a second edge of one of the bearing faces.

The edges can be the extremities of the bearing face which connect the first side to the second side. This arrangement can be particularly effective at inhibiting axial rotation between the bodies. The straps of at least the outer pairs can each have a width that is less than one eighth of the total width of the joint so that the straps of each outer pair can be placed, in some cases adjacent one another, in close proximity to the respective edge. One or more further straps, optionally in pairs, can be provided between the first and second pairs. The straps can be arranged in an alternating pattern across the joint.

The bearing faces can each have a generally planar central portion. This can result in a joint that is stable in compression.

The generally planar central portion of each body can each be generally orthogonal with respect to the sides or central axis (see, e.g., A12, A14 in FIG. 2) of the body in order to define a joint that can support axial loading when the bodies are generally axially aligned. Alternatively, the central portions can each be opposingly tapered to define a 'V' shaped space between them when the bodies are axially aligned in order to define a joint that can support axial loading when the bodies are over center. The latter arrangement can be useful in locking mechanisms such as a landing gear assembly stay arm or lock stay.

The planar middle portion of each bearing face can be flanked on either side by curved end regions which extend away from the opposite body in a convex manner. This arrangement can assist with rolling engagement between the bearing faces during relative rotational movement between the bodies. Also, curved end regions can prevent the straps from being bent beyond an intended radius of curvature as the joint folds, which can reduce the likelihood of strap fatigue or stress damage.

The bearing face of one or each body can include a channel for each flexible strap, the channel or channels for each strap being configured to define a depth which corresponds to the thickness of the strap to house the strap when the bearing faces of the bodies are in contact with one another.

In such cases, the bearing faces can be configured to define prominent land regions between the channels which are arranged to engage corresponding opposite land regions when the bearing faces contact one another. This arrangement can be particularly advantageous when the joint is arranged to react compressive or tensile loads through body to body contact, as in each case the channels can isolate the straps from compressive loading between the bodies. Where channels aren't provided, the bearing faces can indirectly contact one another via the flexible coupling straps.

The straps of the first configuration can be coupled at their end regions to adjacent straps of the first configuration. This can provide a greater adhesive or clamping contact area between the straps and the bodies. In some cases the straps of the first configuration can be formed from a unitary piece of material.

Alternatively, the straps of the first configuration can be coupled to the straps of the second configuration at a middle region which in use is located between the contract faces. The end regions of the straps are free to be coupled to the bodies in the alternating first and second configurations. This arrangement enables all of the straps to be formed from a unitary piece of material.

The second body can include a second bearing face extending between the sides on an opposite end of the second body and the joint can comprise:

a third body having a first side, a second side and a bearing face extending between the sides, the second and third bodies being positioned relative to one another such that the second bearing face of the second body is adjacent to the bearing face of the third body and the first side of each body is closer to the first side of the other body than it is to the second side of the other body; and a second flexible coupling arranged to limit separation of the second bearing face of the second body and the bearing face of the third body while permitting relative rotational movement between the second and third bodies in a movement plane, the second flexible coupling comprising:

one or more flexible straps arranged in a first configuration in which the straps are coupled to the first side of a first one of the second and third bodies and coupled to the second side of a second one of the second and third bodies; and one or more flexible straps arranged in a second configuration in which the straps are coupled to the second side of the first one of the second and third bodies and coupled to the first side of the second one of the second and third bodies, the straps of the first and second configurations being arranged in parallel across the joint.

This arrangement can result in a joint with a greater degree of folding capability and/or a joint which can define a gap adjacent to the joint between the first and third bodies when the first and third bodies are folded into a generally parallel relationship. Further bodies can be included in the joint in an analogous fashion.

The first and second sides of each body can be non-parallel with respect to the general plane of the bearing face. For example, the bearing face can be defined by an end of a member which has generally orthogonal sides that define the sides.

The straps can be formed from flexible fiber reinforced composite material.

The straps can be coupled to the sides of the bodies by couplings, at least some of which are arranged to permit the straps to be removably coupled. This can aid in replacing damaged straps.

In accordance with a second aspect of the invention, there is provided a landing gear assembly comprising one or more assemblies according to the first aspect. Each assembly can define one of a torque link, a side stay or brace; a lock stay, or one body can comprise a slider of a shock absorbing strut and the second body can comprise a bogie beam.

In accordance with a third aspect of the invention, there is provided an aircraft including one or more aircraft assemblies according to the first aspect and/or landing gear assemblies according to the second aspect.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFICATION DESCRIPTION OF EMBODIMENTS OF THE INVENTION

Figure 1:
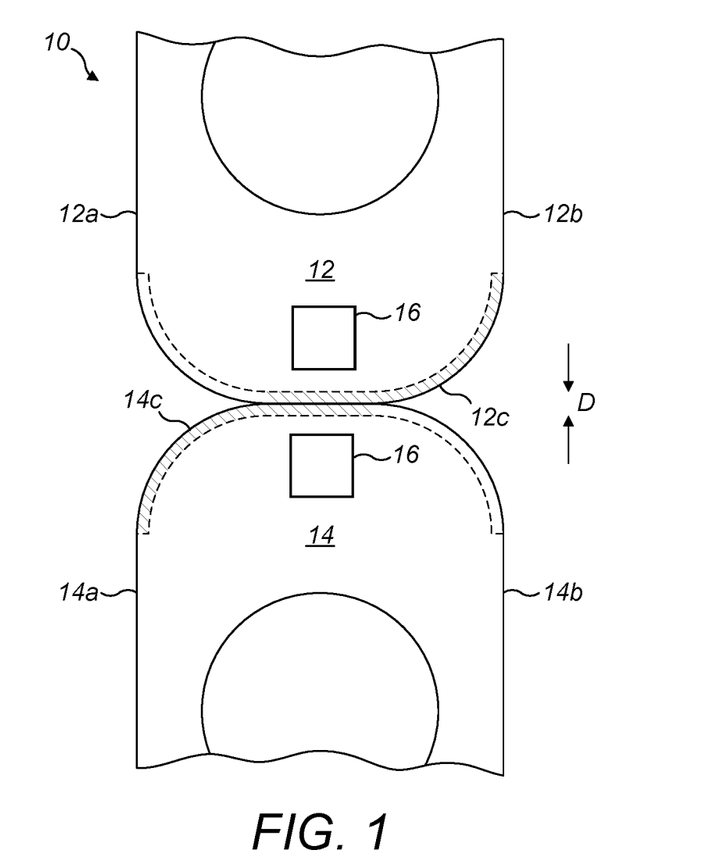
FIG. 1 is side view focusing on the joint of an aircraft assembly according to an embodiment of the invention.
Figure 2:
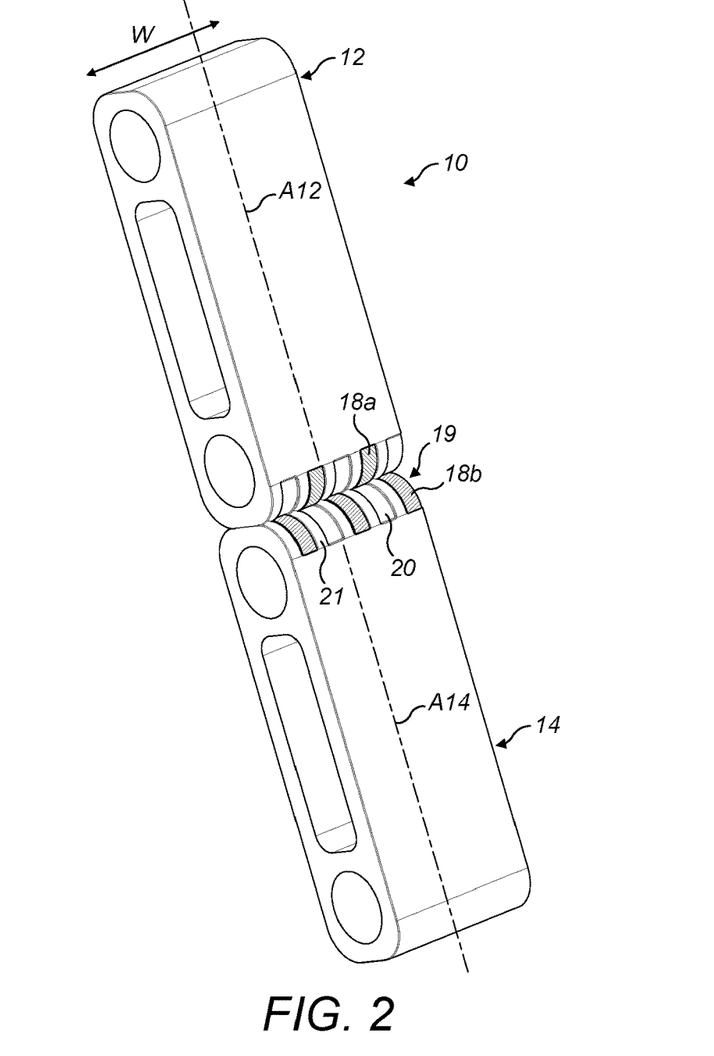
FIG. 2 is a perspective view of the aircraft assembly of FIG. 1.
Figure 3:
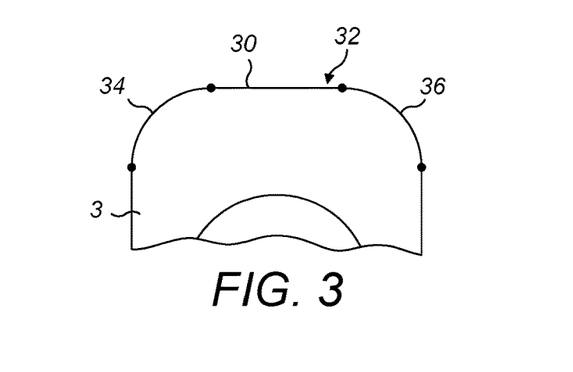
FIG. 3 is a side view of one of the bodies of the aircraft assembly of FIG. 1, illustrating different portions of the bearing face.

Referring to FIGS. 1 to 3, an aircraft assembly joint is shown generally at 10. In the illustrated example the assembly is an aircraft landing gear assembly joint.

The assembly 10 includes two bodies 12, 14 which are connected to each other via a flexible coupling 19 to define a structural member in which the bodies 12, 14 can rotate relative to one another in a constrained manner while remaining in direct or indirect contact with one another. The bodies 12, 14 can be formed from any suitable aerospace grade material, including metals such steel, titanium or aluminium, including alloys, hard plastics materials, fibre composite materials, or metal matrix composite materials.

The first body 12 has a first side 12a, a second side 12b and a bearing face 12c extending between the sides 12a, 12b. The second body 14 has a first side 14a, a second side 14b and a bearing face 14c extending between the sides 14a, 14b. The bodies 12, 14 are positioned relative to one another such that the bearing faces 12c, 14c are adjacent to one another and the first side 12a, 14a of each body is closer to the first side 12a, 14a of the other body than it is to the second side 12b, 14b of the other body.

The flexible coupling 19 is arranged to limit separation of the bearing faces 12c, 14c while permitting relative rotational movement between the bodies 12, 14 in a movement plane which is parallel to the page in FIG. 1.

In the illustrated embodiment the flexible coupling 19 comprises five straps 18. As illustrated in FIG. 1, one end 18a of a strap 18 is connected to the upper body 12 and the other end 18b to the lower body 14. The straps 18 run in alternate directions across the joint 10, as shown in FIG. 2. Any suitable number of straps 18 can be provided.

Channels 20 can be defined between the bodies 12, 14 by one or both of the bodies 12, 14, which open on to the bearing faces 12c, 14c and define land regions 21 in between them. In such embodiments, the thickness of each strap 18 can be less than or preferably equal to the depth D of the corresponding channel 20 when the bodies 12, 14 are in contact. This can result in body to body contact across the width W of the joint and also ensure that compressive loads are supported by land regions 21 of the bodies 12, 14 and not by the straps 18.

In use, as the joint folds from one extremity to the other, the pivot axis which is defined by the area of contact between the bearing faces 12c, 14c across the width of the joint moves from one side of each bearing face to the other. The rolling engagement between the bodies 12, 14 creates a creeping or moving pivot, resulting in a low friction environment because the bearing faces 12c, 14c are moving relative to one another in a pivotal, in some cases rolling, manner, rather than sliding against one another. The low friction environment enables lubricant to be dispensed with, which can lead to a reduced level of maintenance.

The bearing faces 12c, 14c can be provided with a hard, low friction coating in order to reduce fretting; for example, a High Velocity Oxygen Fuel (HVOF) coating can be applied to achieve a smooth and uniform coating.

The first body 12 and second body 14 can each be provided with one or more magnets 16 (such as illustrated schematically in FIG. 1) arranged to define a magnetic coupling across the joint between the bearing faces 12c, 14c, thus helping to resist tensile and torsional loads through the joint. Any suitable magnetic arrangement can be provided; for example, permanent magnets housed within the ends of the bodies adjacent the bearing faces. In another example, the adjacent ends of each body 12, 14 can be magnetised with opposite polarities to create an attractive magnetic coupling biasing the bodies to an aligned condition.

The aircraft assembly 10 can be designed to primarily support high compressive loads by way of providing each body 3 (e.g., bodies 12 and 14) with a respective flat region 30, shown in FIG. 3, in the middle of each bearing respective face 32, with respective curved sides 34, 36 which extend away on either side. Alternatively, the joint can be formed as a chain link configuration (not shown) in which the side of one body extends around and beyond the other body to support high tensile loads. Either way, the load carrying capacity in the opposite direction for either configuration is limited by the design, material and performance of the strap attachment fixtures used.

The straps 18 are preferably arranged to create a non-slip condition between the rolling bearing faces 12c, 14c and can further provide cross-axial stiffness and carry tensile loads on the joint. The straps 18 can be formed from flexible materials such as high tensile strength composite fibres; for example, Toray carbon fibre composite material, T1000G, T800S & T700S produced by Toray Industries, Inc., and S Glass. The tensile load on the joint is shared between the straps.

It is preferred that the straps 18 are always kept taut during folding of the joint. Therefore suitable attachment fixtures are provided to hold the straps 18 in place and also withstand significant shear stresses due to tensile loading of the straps. The straps 18 can be attached to the bodies 12, 14 by way of permanent chemical bonding such as epoxy resin, or by mechanical clamping devices or other mechanical fixing means.

The straps 18 can be individual elements which are attached to the bodies 12, 14 individually, as shown in FIG. 2.

Figure 4:
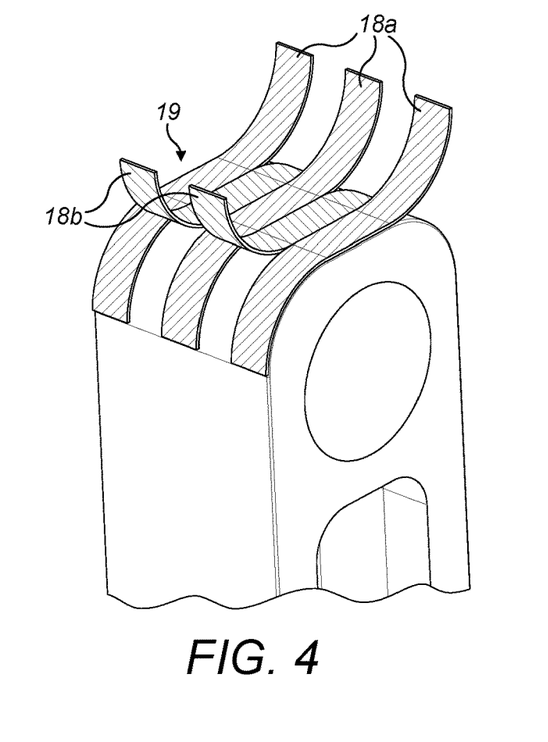
FIG. 4 is a perspective view of a flexible coupling that can be used in embodiments of the invention.

Alternatively, the straps of the first and second configurations 18a, 18b can be coupled to one another at their centres, as shown in FIG. 4, meaning that they can be formed from a unitary piece of material.

Figure 5:
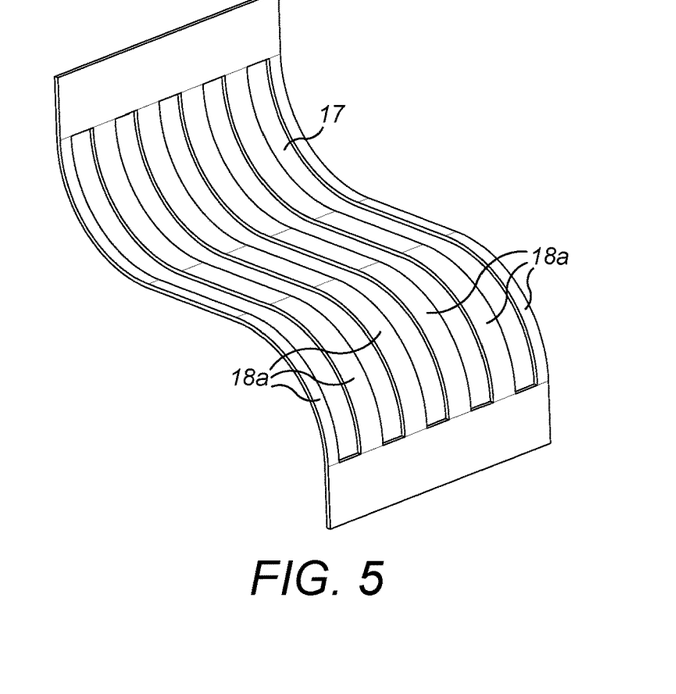
FIG. 5 is a perspective view of an alternative flexible coupling that can be used in embodiments of the invention.

Alternatively, as shown in FIG. 5, the straps 18a of the first configuration can be coupled at their ends and preferably be formed of a unitary piece of material, which provides for a greater adhesive or clamping bearing face. The straps of the second configuration are then individually coupled to the bodies via the spaces 17.

In an alternative embodiment, a single long strap (not shown) can be interwoven through connecting members provided on each body such that the strap runs from one end of the joint to the other. The two ends of the strap can be fixed using permanent chemical bonding, epoxy resin or a mechanical clamp on either side of the joint.

Figure 6:
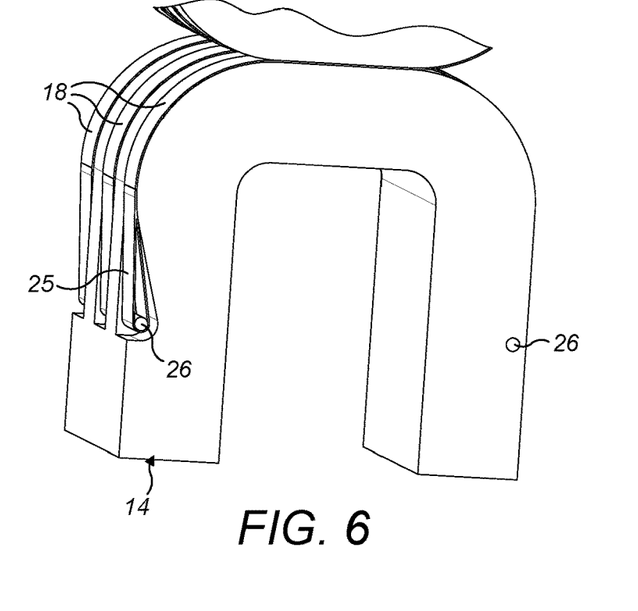
FIG. 6 is a perspective view of an aircraft assembly according to a further embodiment of the invention in which the straps are removably coupled to the bodies.

Referring now to FIG. 6, it is preferred that the straps are removably coupled to the bodies 12, 14 to aid in replacing damaged or worn straps 18. For example, the ends 25 of the straps 18 can be looped around pins 26 which are embedded in the bodies 12, 14 and runs along the width of the joint and are generally orthogonal to the movement plane. The pins 26 can either be arranged to be axially withdrawn to release straps 18, or the pins can be movably mounted within vertical slots (not shown) which enable the pins 26 to be locked in a tensioning position and unlocked so as to be movable closer to the joint interface to loosen the straps 18.

Figure 7:
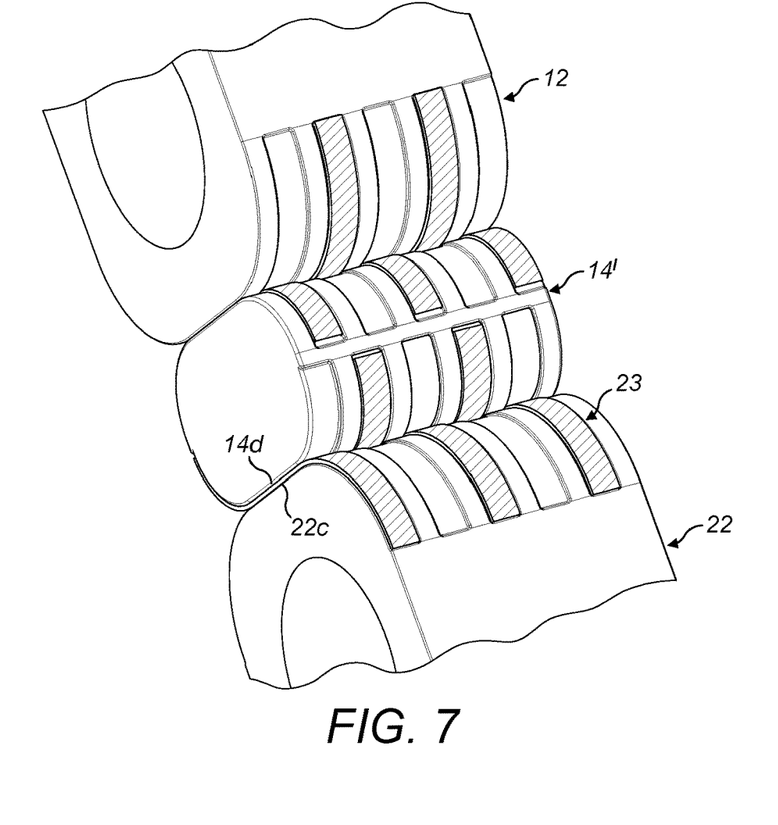
FIG. 7 is a perspective view of an aircraft assembly according to a further embodiment of the invention in which the assembly includes more than two bodies.

Referring now to FIG. 7, in another embodiment the second body 14' can be arranged as an intermediate pivot body between the first body 12 and a third body 22. The second body 14' is provided with a second bearing face 14d which is coupled to a bearing face 22c of the third body 22 via a second flexible coupling 23.

The joint according to embodiments of the invention can be incorporated into various aircraft assemblies in order to provide a low friction joint that requires less maintenance and can have a longer operational life span than a regular pin joint.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:
1. An aircraft landing gear assembly comprising:
a first body having a respective first side, a respective second side and a respective bearing face extending between the respective first side and the respective second side;
a second body having, at a first end thereof, a respective first side, a respective second side and a respective bearing face extending between the respective first side and the respective second side, the second body being positioned relative to the first body such that the respective bearing faces are adjacent to one another and the respective first side of each body is closer to the respective first side of the other body than it is to the respective second side of the other body; and
a flexible coupling arranged to limit separation of the bearing faces while permitting relative rotational movement between the bodies in a movement plane so as to define a joint between the first body and the second body, the flexible coupling comprising:
one or more first flexible straps arranged in a first configuration in which the first flexible straps are coupled to the first side of the first body and coupled to the second side of the second body; and
one or more second flexible straps arranged in a second configuration in which the second flexible straps are coupled to the second side of the first body and coupled to the first side of the second body, the first flexible straps and the second flexible straps being arranged in parallel across the joint;

wherein each bearing face has a respective planar central portion that is flanked on either side by a respective curved end region that extends away from the opposite body to define a respective convex outer rolling surface, and the joint is configured such that:

the respective planar central portions contact one another when the first body and the second body are aligned to support compressive loads along the first body and the second body, the respective convex outer rolling surfaces of the first body react loads applied to them by the second body during the rotational movement between the bodies in the movement plane, and the respective convex outer rolling surfaces of the second body react loads applied to them by the first body during the rotational movement between the bodies in the movement plane, such that a point of contact between the first body and the second body moves along curves of the respective curved end regions during the rotational movement between the bodies in the movement plane.

2. The aircraft landing gear assembly according to claim 1, wherein the flexible coupling comprises a first strap pair and a second strap pair, each of the first strap pair and the second strap pair comprising one of the first flexible straps and one of the second flexible straps, the first strap pair being located adjacent to a first edge of one of the bearing faces and the second strap pair being located adjacent to a second edge of the one of the bearing faces.

3. The aircraft landing gear assembly according to claim 2, wherein the flexible coupling comprises one or more further straps between the first strap pair and the second strap pair.

4. The aircraft landing gear assembly according to claim 3, wherein the one or more first flexible straps and the one or more second flexible straps are arranged in an alternating pattern across the joint.

5. The aircraft landing gear assembly according to claim 1, wherein the respective planar central portions are orthogonal with respect to a central axis of the respective body such that the joint is configured to support axial loading when the first body and the second body are axially aligned.

6. The aircraft landing gear assembly according to claim 1, wherein the bearing face of the first body and the bearing face of the second body are opposingly tapered to define a 'V' shaped space between them when the first body and the second body are axially aligned such that the joint is configured to support axial loading when the first body and the second body are over center.

7. The aircraft landing gear assembly according to claim 1, wherein the bearing face of one or each body includes a respective channel for each flexible strap, the channel or channels for each strap being configured to define a depth which corresponds to the thickness of the strap to house the strap when the bearing faces of the bodies are in contact with one another and wherein the bearing faces are configured to define respective prominent land regions between the channels that are arranged to engage corresponding opposite land regions when the bearing faces contact one another.

8. The aircraft landing gear assembly according to claim 1, wherein the first body and second body are each provided with one or more magnets arranged to define an attractive magnetic coupling across the joint between the bearing faces.

9. The aircraft landing gear assembly according to claim 1, wherein one or more of the first flexible straps are coupled at their end regions to adjacent respective one or more first flexible straps.

10. The aircraft landing gear assembly according to claim 1, wherein one or more of the first flexible straps are coupled to respective second flexible straps at a middle region which in use is located between the bearing faces.

11. The aircraft landing gear assembly according to claim 1, wherein the second body comprises, at a second end thereof that is opposite the first end thereof, a second bearing face extending between the respective first side and the respective second side, and the assembly further comprises:

a third body having a respective first side, a respective second side and a respective bearing face extending between the respective first side and the respective second side, the second and third bodies being positioned relative to one another such that the second bearing face of the second body is adjacent to the respective bearing face of the third body and the respective first side of each body is closer to the respective first side of the other body than it is to the respective second side of the other body; and a second flexible coupling arranged to limit separation of the second bearing face of the second body and the respective bearing face of the third body while permitting relative rotational movement between the second body and the third body in a movement plane so as to define a joint between the bodies, the second flexible coupling comprising:

one or more third flexible straps arranged in a third configuration in which the third straps are coupled to the first side of the second body and coupled to the second side of the third body; and one or more fourth flexible straps arranged in a fourth configuration in which the fourth straps are coupled to the second side of the second body and coupled to the first side of the third body, the third and fourth straps being arranged in parallel across the joint.

12. The aircraft landing gear assembly according to claim 1, wherein the first flexible straps and the second flexible straps are formed from flexible fibre reinforced composite material.

13. The aircraft landing gear assembly according to claim 1, wherein the first flexible straps and the second flexible straps are coupled to the sides of the first body and the second body by couplings, at least some of which are arranged to permit the first flexible straps and the second flexible straps to be removed from one or both of the first body and the second body.

14. The aircraft landing gear assembly or an aircraft including one or more assemblies according to claim 1.

15. The aircraft landing gear assembly according to claim 1 wherein the joint is arranged to be coupled to the underside of an aircraft and configured to support the aircraft when the aircraft is on the ground.

16. The aircraft landing gear assembly according to claim 1 wherein the joint is arranged to withstand and transfer landing loads directly or indirectly to an airframe of an aircraft.

17. The aircraft landing gear assembly according to claim 1, wherein the one or more first flexible straps are attached to the first side of the first body and attached to the second side of the second body; and the one or more second flexible straps attached to the second side of the first body and attached to the first side of the second body.

18. An aircraft landing gear assembly comprising:
a first body having a first side, a second side and a bearing face extending between the sides;
a second body having a first side, a second side and a bearing face extending between the sides, the bodies being positioned relative to one another such that the bearing faces are adjacent to one another and the first side of each body is closer to the first side of the other body than it is to the second side of the other body; and
a flexible coupling arranged to limit separation of the bearing faces while permitting relative rotational movement between the bodies in a movement plane so as to define a joint between the bodies, the flexible coupling comprising:
one or more flexible straps arranged in a first configuration in which the straps are coupled to the first side of the first body and coupled to the second side of the second body; and
one or more flexible straps arranged in a second configuration in which the straps are coupled to the second side of the first body and coupled to the first side of the second body, the straps of the first and second configurations being arranged in parallel across the joint wherein:
wherein the first body and the second body define a landing gear torque link, a landing gear side stay, or a landing gear lock stay; and wherein:
each bearing face has a respective planar central portion, and the joint is arranged such that the respective central planar portions face one another when the first body and the second body are aligned so that the respective planar central portion of the bearing face of the first body is engaged with the respective planar central portion of the bearing face of the second body to react landing loads.

* * * * *